No. 653,582.  
F. W. MERRITT.  
CLOTHES SPRINKLER.  
(Application filed Nov. 8, 1899.)  
Patented July 10, 1900.
(No Model.)
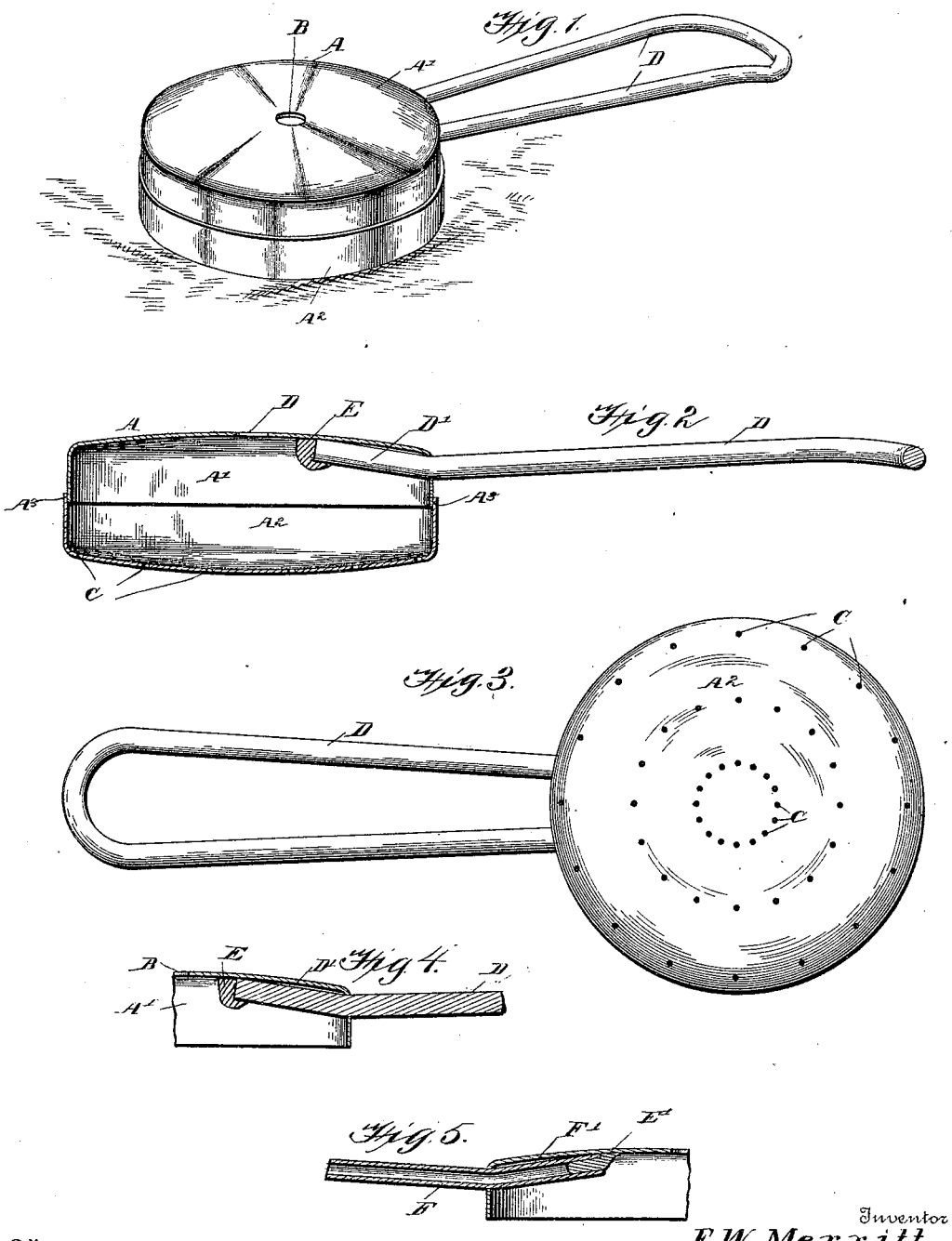

UNITED STATES PATENT OFFICE.

FRANK W. MERRITT, OF NEW BRUNSWICK, NEW JERSEY.

CLOTHES-SPRINKLER.

SPECIFICATION forming part of Letters Patent No. 653,582, dated July 10, 1900.

Application filed November 8, 1899. Serial No. 736,264. (No model.)

*To all whom it may concern:*

Be it known that I, FRANK W. MERRITT, a citizen of the United States, residing at New Brunswick, in the county of Middlesex and State of New Jersey, have invented a new and useful Clothes-Sprinkler, of which the following is a specification.

This invention is a new and useful clothes-sprinkler, the object being to provide an exceedingly cheap and simple device which can be rapidly filled with water and easily operated to sprinkle the water over the clothes to be ironed.

With this object in view the invention consists, essentially, of a cylindrical hollow having an opening at the top and a series of perforations in the bottom, said cylindrical hollow being composed of two sections and a handle connected to one of the sections in the manner hereinafter described.

The invention consists also in certain details of construction and novelties of combination, all of which will be fully described hereinafter, and pointed out in the claims.

In the drawings forming a part of this specification, Figure 1 is a view showing a clothes-sprinkler constructed in accordance with my invention. Fig. 2 is a sectional view of the same. Fig. 3 is a bottom plan view. Fig. 4 is a detail section showing the manner of securing the handle to one of the sections of the body, and Fig. 5 shows a slight modification.

In carrying out my invention I employ a hollow body A, which is essentially cylindrical in shape and formed of an upper section A' and a lower section $A^2$, kneading edges being soldered at $A^3$. The top has a central perforation B, while the bottom section has a series of perforations C produced therein. The handle D is formed of a single piece of suitable metal wire bent centrally upon itself and having its ends projected through the sides of the top section and bent slightly upwardly, as shown at D', in order to rest adjacent to the top of the section and to which it is secured by solder E', the solder adhering to the top of the section and also to the end of the handle. In Fig. 5 I have shown a slight modification in which the handle F is constructed of a tubular rod and has its ends F' bent to conform to the top of the section, the same as the solid rod, and solder E', which is connected to the top, enters into the open end of the tubular rod and in this manner more securely connects the said end to the top section.

In operation the body of the sprinkler is laid in a basin or bowl of water and fills itself within less than half a minute. The device is then manipulated from the handle, and by shaking the same gently the clothes will be evenly sprinkled.

It will also be understood that the device can be used for sprinkling floors, &c. The water can be held in suspension by placing the finger over the vent-hole or the handle can be made hollow and provided with a vent-hole. The apertured section is shaped to drain clear of water after using.

Having thus fully described my invention, what I claim as new, and desire to secure by Letters Patent, is—

1. A clothes-sprinkler, consisting of a cylindrical body composed of two sections, the upper section having a single central opening, and the lower section a series of perforations, the handle formed of a single piece bent centrally upon itself, and having its ends projecting through the side of one of the sections, said inwardly-projecting ends being curved upwardly to rest adjacent to the top of the section to which it is secured, substantially as described.

2. In a clothes-sprinkler, the combination with the cylindrical body of the handle formed of tubular material, the ends thereof projecting into the cylindrical body, said inwardly-projecting ends being bent to rest adjacent to the top of the body and to which it is secured, substantially as shown and described.

FRANK W. MERRITT.

Witnesses:
 MILES V. BENNETT,
 E. L. GOODWIN.